US011483284B2

(12) United States Patent
Sharma et al.

(10) Patent No.: US 11,483,284 B2
(45) Date of Patent: Oct. 25, 2022

(54) RECOMMENDING NETWORK NANO-SEGMENTATION FOR MICRO-SERVICES USING FLOW ANALYSIS

(71) Applicant: VMWARE, INC., Palo Alto, CA (US)

(72) Inventors: Abhijit Sharma, Pune (IN); Prahalad Deshpande, Pune (IN); Atul Jadhav, Pune (IN); Nikhil Bhalerao, Pune (IN); Shashank Ranjan, Pune (IN)

(73) Assignee: VMWARE, INC., Palo Alto, CA (US)

( * ) Notice: Subject to any disclaimer, the term of this patent is extended or adjusted under 35 U.S.C. 154(b) by 393 days.

(21) Appl. No.: 16/436,930

(22) Filed: Jun. 11, 2019

(65) Prior Publication Data
US 2020/0336457 A1    Oct. 22, 2020

(30) Foreign Application Priority Data

Apr. 17, 2019 (IN) .............................. 201941015422

(51) Int. Cl.
*H04L 9/40* (2022.01)
*H04L 43/08* (2022.01)
*H04L 41/0806* (2022.01)

(52) U.S. Cl.
CPC .......... *H04L 63/02* (2013.01); *H04L 41/0806* (2013.01); *H04L 43/08* (2013.01); *H04L 63/0263* (2013.01); *H04L 63/20* (2013.01); *H04L 63/0236* (2013.01); *H04L 63/14* (2013.01)

(58) Field of Classification Search
CPC ..... H04L 63/02; H04L 41/0806; H04L 43/08; H04L 63/0263; H04L 63/20; H04L 63/14
See application file for complete search history.

(56) References Cited

U.S. PATENT DOCUMENTS

| 9,521,115 B1 * | 12/2016 | Woolward .......... H04L 63/1416 |
| 9,819,699 B1 | 11/2017 | Nenov |
| 10,698,714 B2 * | 6/2020 | Krishnamurthy ... G06F 9/45558 |
| 10,701,104 B2 | 6/2020 | Malkov et al. |

(Continued)

OTHER PUBLICATIONS

Wade Holmes, Micro-Segmentation Defined—NSX Securing "Anywhere"—Part 1, Jun. 3, 2016: https://blogs.vmware.com/networkvirtualization/2016/06/micro-segmentation-defined-nsx-securing-anywhere.html/.

(Continued)

*Primary Examiner* — Minh Chau Nguyen
(74) *Attorney, Agent, or Firm* — Patterson & Sheridan, LLP

(57) ABSTRACT

The present disclosure provides an approach for generating one or more firewall rules to regulate communication between containerized services running within containers. The approach includes determining which services communicate with each other, independently of in which containers the services execute. The determining occurs over a period of time. If two services communicated with each other during the period of time, then the firewall allows the services to continue communicating, but only over the same ports as used during the period of time. If two services did not communicate during the period of time, then the firewall does not allow the services to communicate after the expiration of the period of time. In some embodiments, redetermining the communication flow over a new period of time may occur after the initial period of time so as to refresh the firewall rules.

18 Claims, 6 Drawing Sheets

(56) References Cited

U.S. PATENT DOCUMENTS

| | | | |
|---|---|---|---|
| 10,719,369 B1* | 7/2020 | Aithal | G06F 9/45558 |
| 2016/0359872 A1 | 12/2016 | Yadav et al. | |
| 2017/0364702 A1 | 12/2017 | Goldfarb et al. | |
| 2018/0063048 A1 | 3/2018 | Patel et al. | |
| 2018/0109562 A1 | 4/2018 | Nenov | |
| 2018/0181763 A1 | 6/2018 | Gunda | |
| 2018/0367398 A1 | 12/2018 | Pani et al. | |
| 2018/0367413 A1 | 12/2018 | Kompella et al. | |
| 2019/0081852 A1 | 3/2019 | Nazar et al. | |
| 2019/0081871 A1 | 3/2019 | Nazar et al. | |
| 2020/0067801 A1* | 2/2020 | McCormick | H04L 63/0227 |
| 2020/0097662 A1 | 3/2020 | Hufsmith et al. | |
| 2020/0177549 A1* | 6/2020 | Barton | H04L 63/0263 |
| 2020/0225964 A1 | 7/2020 | Soman et al. | |
| 2020/0236037 A1 | 7/2020 | Shu et al. | |
| 2020/0296007 A1* | 9/2020 | Finn, II | H04L 43/045 |
| 2021/0006543 A1 | 1/2021 | Deshpande et al. | |

OTHER PUBLICATIONS

"Creating and Using Epoch Maps"; https://docs.epoch.nutanix.com/tutorials/creating-and-using-maps/.

Scott M. Fulton, III "No Agents Needed to Monitor Containers, Says Sysdig, Just Linux Kernal Changes", Jul. 17, 2015: https://thenewstack.io/no-agents-needed-to-monitor-containers-says-sysdig-just-linux-kernel-changes/.

Amir Jerbi, "Network Nano-Segmentation for Container Security in Aqua 2.0", Feb. 2, 2017; https://blog.aquasec.com/network-nano-segmentation-for-container-security-in-aqua-2.0.

"Application Security Software—AppDefense": https://www.vmware.com/products/appdefense.html.

Yasen Simeonov, "Kubernetes Container Networking with NSX-T Data Center Deep Dive", Vmware, Inc., NET1677BU, Vmworld 2018 Content; https://cms.vmworldonline.com/event_data/10/session_notes/NET1677BU.pdf.

* cited by examiner

RECOMMENDING NETWORK NANO-SEGMENTATION FOR MICRO-SERVICES USING FLOW ANALYSIS

RELATED APPLICATIONS

Benefit is claimed under 35 U.S.C. 119(a)-(d) to Foreign Application Serial No. 201941015422 filed in India entitled "RECOMMENDING NETWORK NANO-SEGMENTATION FOR MICRO-SERVICES USING FLOW ANALYSIS", on Apr. 17, 2019, by VMware, Inc., which is herein incorporated in its entirety by reference for all purposes.

BACKGROUND

A computing system including a plurality of physical host machines may run several computing services or micro-services, such as applications or sub-parts of an application. The services may execute from virtual machines and/or containers. A service running in a container is referred to herein as a containerized service. Virtual machines are an abstraction of physical hardware of a physical host machine, allowing the hardware of a single physical host machine to be abstracted into multiple virtual machines that share the hardware. A virtual machine itself may run an operating system. Containers are similar to virtual machines, but instead of abstracting the physical hardware, containers are an abstraction at the application layer that package code and dependencies together. Accordingly, multiple containers can run on the same physical host (or even within a virtual machine) and share the operation system kernel with other containers. In certain aspects, containers are therefore an abstraction of the underlying operating system. A container packages an application and dependencies of the application so that the application runs reliably in different computing environments.

Some containerized services may be susceptible to attack by a malicious entity. The malicious entity may further use a compromised containerized service to communicate with other containerized services. Such communication can compromise the other containerized services, and can compromise the computing system as a whole.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for generating one or more firewall rules to regulate communication between containerized services. The rules of the firewall may be regarded as enforcing a "nano-segmentation" between containerized services. The approach includes determining communication flow including which services communicate with each other, independently of in which containers the services execute. The determining occurs over a period of time. If two services communicated with each other during the period of time, then the firewall allows the services to continue communicating, but only over the same ports as used during the period of time. If two services did not communicate during the period of time, then the firewall applies or maintains the default rule to the communication, such as not allowing the services to communicate after the expiration of the period of time. In some embodiments, redetermining the communication flow over a new period of time may occur after the initial period of time so as to refresh the firewall rules.

The present approach is a technical solution to a technical problem, with the practical application of improving security between container communication. The present approach improves a firewall of a computer system, and therefore is a specific function improving computer technology and the functioning of the computer itself.

Figure 1:
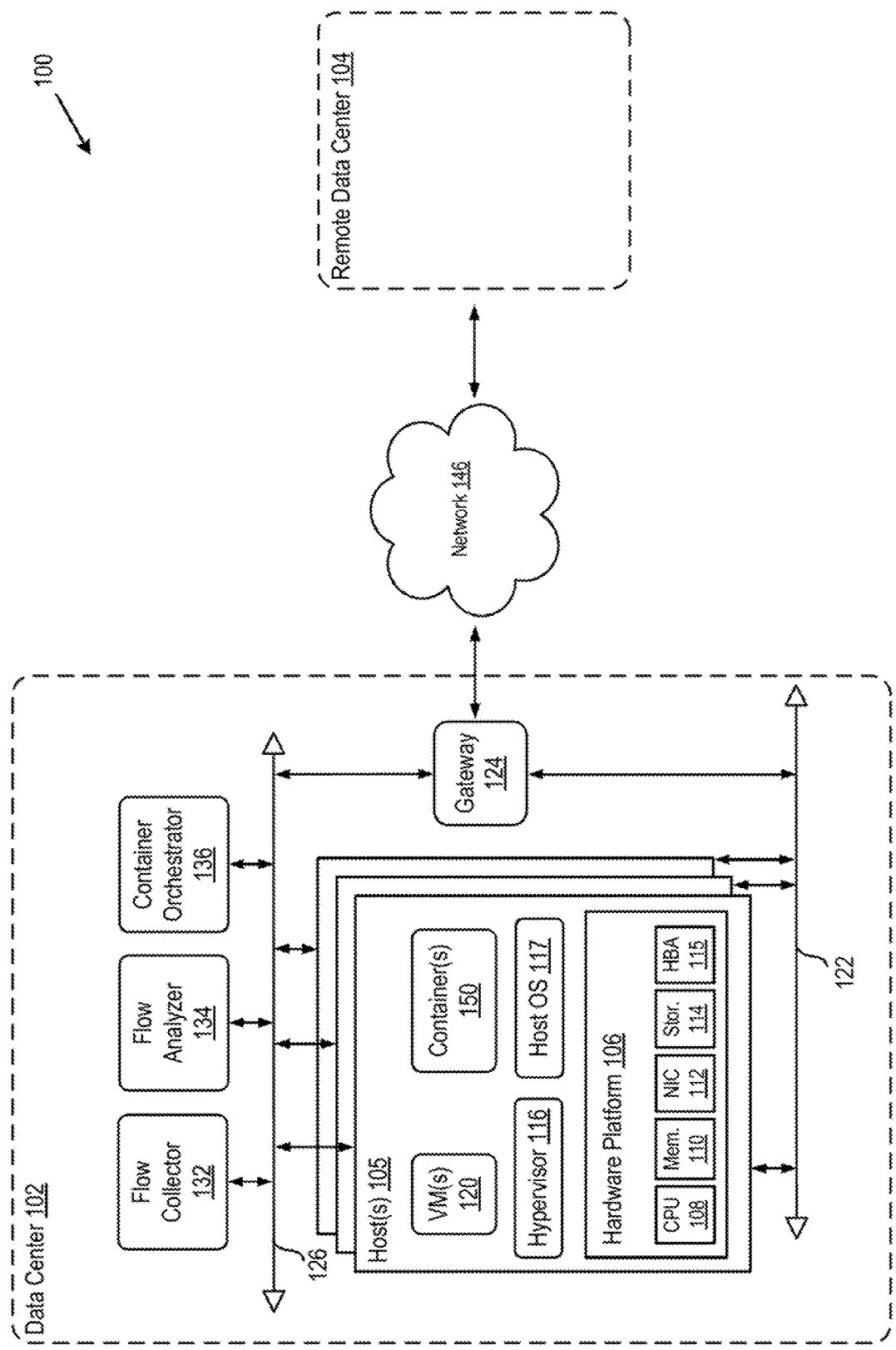
FIG. 1 depicts a block diagram of a computer system in which one or more embodiments of the present disclosure may be utilized, according to an embodiment.

FIG. 1 depicts a block diagram of a computer system 100 in which one or more embodiments of the present disclosure may be utilized, according to an embodiment. Computer system 100 includes data center 102 and a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a gateway 124, a management network 126, a data network 122, a flow collector 132, a flow analyzer 134, and a container orchestrator 136. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

In certain aspects, host 105 is configured to provide a virtualization layer or virtualization system/software, also referred to as a hypervisor 116, that abstracts processor, memory, storage, and networking resources of hardware platform 106 into one or more multiple virtual computing instances (VCIs) that run concurrently on the same host. For example, VCIs may be virtual machines 120 (collectively referred to as VMs 120 and individually referred to as VM 120) run by hypervisor 116. The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system (e.g., host operating system 117) in the server. In some implementations, the hypervisor may comprise system level software as well as a "Domain 0" or "Root Partition" virtual machine, which is a privileged machine that has access to the physical hardware resources of the host. In this implementation, a virtual switch, along with hardware drivers, may reside in the privileged virtual machine.

In certain aspects, VCIs may be containers 150 (collectively referred to as containers 150 and individually referred to as container 150). In certain aspects, as shown, containers 150 run on top of host operating system 117. Although container 150 is shown as running on top of host operating system 117, containers 150 may alternatively or additionally run within one of VMs 120, on top of a guest operating system of that VM 120, as discussed below with reference to FIG. 2; on top of hypervisor 116; or even as a bare metal installation. Containers 150 are further described below with reference to FIG. 2.

Hardware platform 106 of each host 105 may include components of a computing device such as one or more processors (CPUs) 108, system memory 110, a network interface 112, storage system 114, a host bus adapter (HBA) 115, and other I/O devices such as, for example, a mouse and keyboard (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Gateway 124 provides VCIs 120, 150 and other components in data center 102 with connectivity to network 146 used to communicate with remote data center 104. Gateway 124 may manage external public IP addresses for VCIs 120, 150, and may route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Flow collector 132 is a software component of data center 102 that collects container communication flow information (e.g., packet attributes of packets flowing between containers 150). In an embodiment, network packets sent from a source container 150 to a destination container 150 through flow collector 132. Flow collector 132 then extracts packet attributes from the packets. In another embodiment, packets sent from a source container 150 to a destination container 150 flow through devices configured to extract, as metadata, packet attributes from the packets. The devices may be configured to then send the metadata to flow collector 132. The extracted metadata may be in the format of Internet Protocol Flow Information Export (IPFIX). In an embodiment, flow collector 132 collects flow information of a subgroup of containers 150 executing within data center 102, and a second flow collector collects flow information of a second subgroup of containers 150.

In an embodiment, the device that extracts packet attribute is a switch and/or a router, such as a virtual switch or virtual router. The extracted packet attributes may be, for example, in the form of a five-tuple, as described below. Optionally, flow collector 132 and/or the device configured to extract packet attributes time-stamps every five-tuple extracted from a packet. The time-stamping may include associating each five-tuple with the current time, by for example, adding an additional field to the five-tuple to create a six-tuple.

It should be noted that the approach to collecting communication flow information described herein is an "agent-less" approach. For example, in an agent approach, the communication flow information of containers 150 running within host 105 is collected by an agent or component running within that same host 105. In the agentless approach described herein, collection of flow information occurs on a device that is located outside of host 105 on which some or all of the containers 150 are located, the containers 150 being containers for which flow collector 132 is collecting flow information. In the agentless approach, flow collector 132 or the device configured to extract packet attributes collects flow information from containers 150 located across a plurality of hosts 105.

The extracted packet attributes may be, for example, in the form of a five-tuple, and may include (1) source IP address of container 150 from which the packet was sent, (2) source port number from which the packet was sent, (3) destination IP address of container 150 to which the packet was sent, (4) destination port number to which the packet was sent, and (5) protocol identifier. The protocol identifier may identify the protocol used in communication, and the protocol may be, for example, Transmission Control Protocol (TCP) or User Datagram Protocol (UDP). Optionally, every five-tuple extracted and stored by flow collector 132 may be associated with a time to indicate the time when flow collector 132 extracted the five-tuple information. Flow collector 132 may obtain, collect, transmit, and/or store container communication flow information using the IPFIX protocol and format.

Flow collector 132 may be a component of a switch or a router within data center 102. Flow collector may be a component of firewall 238 (see FIG. 2). Flow collector 132 may be a distributed component of data center 132, with instances of flow collector running within a plurality of hosts 105 and/or switches or routers of data center 102. In an embodiment, if flow collector 132 is distributed, instances of flow collector 132 may communicate with one another to share individually collected information. Flow collector 132 may be a centralized component, running within one of hosts 105 or VMs 120, or within a different device.

Container orchestrator 136 creates and deletes containers 150, such as when a request to create or delete a container 150 is received by container orchestrator 136 from an administrator, or when container orchestrator 136 determines that a container 150 should be created or deleted. As used herein, to "create" a container 150 means to instantiate the container 150 from a container image 252 (see FIG. 2). As used herein, to "delete" a container 150 means to power off the container 150 so that the container 150 is no longer in a running or executing state. Container orchestrator 136 stores a record of what containers 150 were created and/or deleted, the IP address of those containers 150, and what service(s) 222 was executing within or from a given container 150. Container orchestrator 136 may store an association between (a) each previously or currently running container, (b) the service(s) 222 (see FIG. 2) running from each container 150, and optionally (c) the period of time during which the container was active. The period of time may be useful because the same IP address could be assigned to multiple non-concurrently running containers 150 within a period of time. Recording the time period during which a container of a given IP address was active allows differentiation between those containers. For example, assume container 150 with IP address A and service B was active during time C, and container 150 with IP address A and service E was active during time F. Flow analyzer 134 might request information from container orchestrator 136 regarding what service 222 was running from container 150 that had IP address A. Because two different containers 150 have IP address A stored in the records of container orchestrator 136, flow analyzer 134 may provide a time during which IP address A was active so that container orchestrator may select the appropriate container 150 and service 222. An example of a container orchestrator is the open-source software Kubernetes®. Container orchestrator 136 may run on a virtual computing instance or as a software module running within a host 105.

Flow analyzer 134 is a software component of data center 102 that builds a map of service 222 (see FIG. 2) communication flow. Flow analyzer 134 builds the map representing communication flow of services 222 by using (a) five-tuple information collected by flow collector 132, and (b) associations between container IP addresses and services 222 stored by container orchestrator 136. Flow analyzer 134 obtains the five-tuple information, along with an optional time stamp of the five-tuple, from flow collector 132, and then uses the five tuple-information and optionally the time stamp to request information regarding what service 222 was running from container 150 an IP address from the five-tuple. Flow analyzer 134 uses the obtained information to build a service communication map. An example service communication map is shown in FIG. 4, and is further discussed below with reference to FIGS. 3 and 4. Flow analyzer 134 may run on a virtual computing instance or as a software module running within a host 105.

Figure 2:
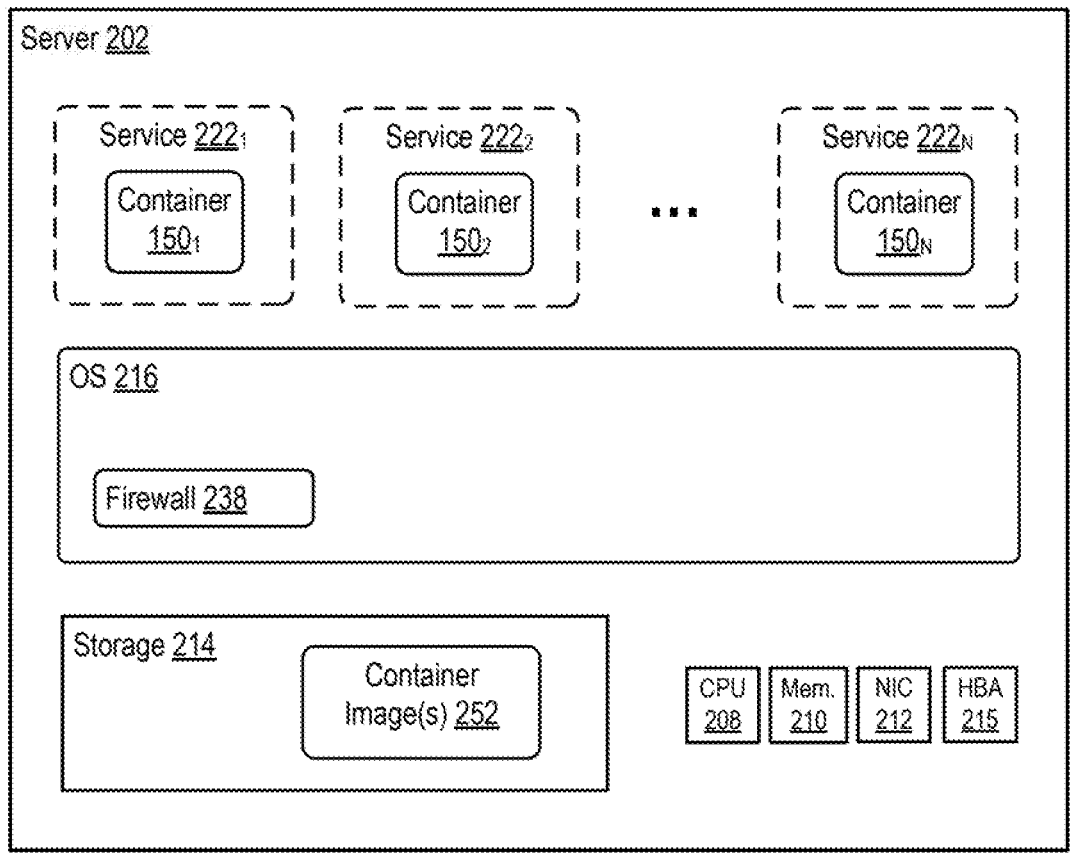
FIG. 2 depicts a block diagram of a server, according to an embodiment.

FIG. 2 depicts a block diagram of a server 202, according to an embodiment. Server 202 may be one of hosts 105 or one of VMs 120 shown in FIG. 1.

If server 202 is a VM 120, then each hardware component (memory, CPU, NIC, storage, HBA, etc.) of that server 202 is actually a virtualized component, such as virtualized through hypervisor 116 running on physical host 105. If server 202 is a VM 120, then each server 202 may be on the same host 105 or on different hosts 105. Each server 202 may be within the same data center 102, or may be located within a plurality of data centers, such as data center 102 and 104, and/or other data centers. Components 208, 210, 212, 214, and 215 may be substantially similar to components 108, 110, 112, 114, and 115 described in FIG. 1.

OS 216 may be a standard operating system such as Microsoft Windows® or Linux®. OS 216 may be hypervisor 116 described above with reference to FIG. 1. If server 202 is a VM 120, then OS 216 may be a guest OS, such as a standard OS, running within the VM 120. If server 202 is a host 105, then OS 216 may be a standard OS or hypervisor 116. If server 202 is a host 105, then OS 216 may represent one of standard OS or hypervisor 116, or OS 216 may represent both a hypervisor 116 and a standard OS, with hypervisor 116 running on top of the standard OS.

OS 216 includes an instance of a firewall 238 (e.g., a distributed firewall that is maintained and controlled across multiple hosts 105 or VMs 120) that filters network packets arriving at server 202 and outgoing from server 202. In an embodiment, packets sent to or by containers 150 pass through OS 216 and/or firewall 238 for processing. Firewall 238, may comprise multiple software modules for filtering network packets by referencing security or firewall settings of firewall 238. All or substantially all OSs 216 within system 100 may have a running instance of firewall 238. Firewall 238 may be controlled by rules maintained by a centralized or a distributed controller (not shown).

OS 216 may comprise a virtual switch (not shown), which serves as an interface between the hosted VCIs 120, 150, as well as other physical resources available on host 105. OS 216 may include a Virtual Extensible Local Area Network (VXLAN) tunnel endpoint (VTEP). Each of VCIs 120, 150 may include a virtual network interface card (VNIC), which is responsible for exchanging packets between the VCI 120, 150 and OS 216. A logical VCI network may be implemented by encapsulating data packets that are generated by VCIs 120, 150 for delivery through the underlying physical network. The VTEP of the virtual switch may be used when, for example, containers 150 that are located on different hosts 105 are communicating. The virtual switch may extract packet attributes from packets sent between containers 150, as described above.

Container image 252 is a package of software (e.g., a package of service 222 or of an application) that contains the service's code, system tools, configurations, settings, system libraries, and other dependencies as a single portable object that is executable independently of infrastructure and computing environment (e.g., independently of the type of operating system on which container 150 executes). Container 150 is created by instantiating container image 252. Container image 252 becomes container 150 at runtime. The code within container image 252 is the code that executes service 222 associated with that container 150. At runtime, container 150 is an isolated user space in which service 222 runs directly on the kernel of OS 216. Containers 150 in the same server 202 execute on top of the same OS 216. That is, containers 150 share the same OS 216 and share the same kernel of OS 216. Container 150 does not comprise its own OS. Container image 252 may comprise a file system of container 150 that is launched from that container image 252, and/or a file system of service 222 that executes from that launched container 150, such as for example, the A Union File System (AUFS). In an embodiment, the file system stored within container image 252 is a separate file system than that of OS 216. In an embodiment, the file system stored within container image 252 is a stateless file system by default, but the file system stored within container image 252 may retain state if storage volumes are attached and reattached to containers as the containers are created and deleted. The storage volumes may be, for example, logical storage volumes that abstract physical storage.

In an embodiment, the file system stored within container image 252 operates independently of the operation of the file system of OS 216 when accessing data stored within container image 252. In an embodiment, the file system stored within container image 252 does not depend on any configuration of the file system of OS 216 when accessing data stored within container image 252. In an embodiment, the file system stored within container image 252 does not use or make a call to the file system of OS 216 when accessing data stored within container image 252.

Figure 3:
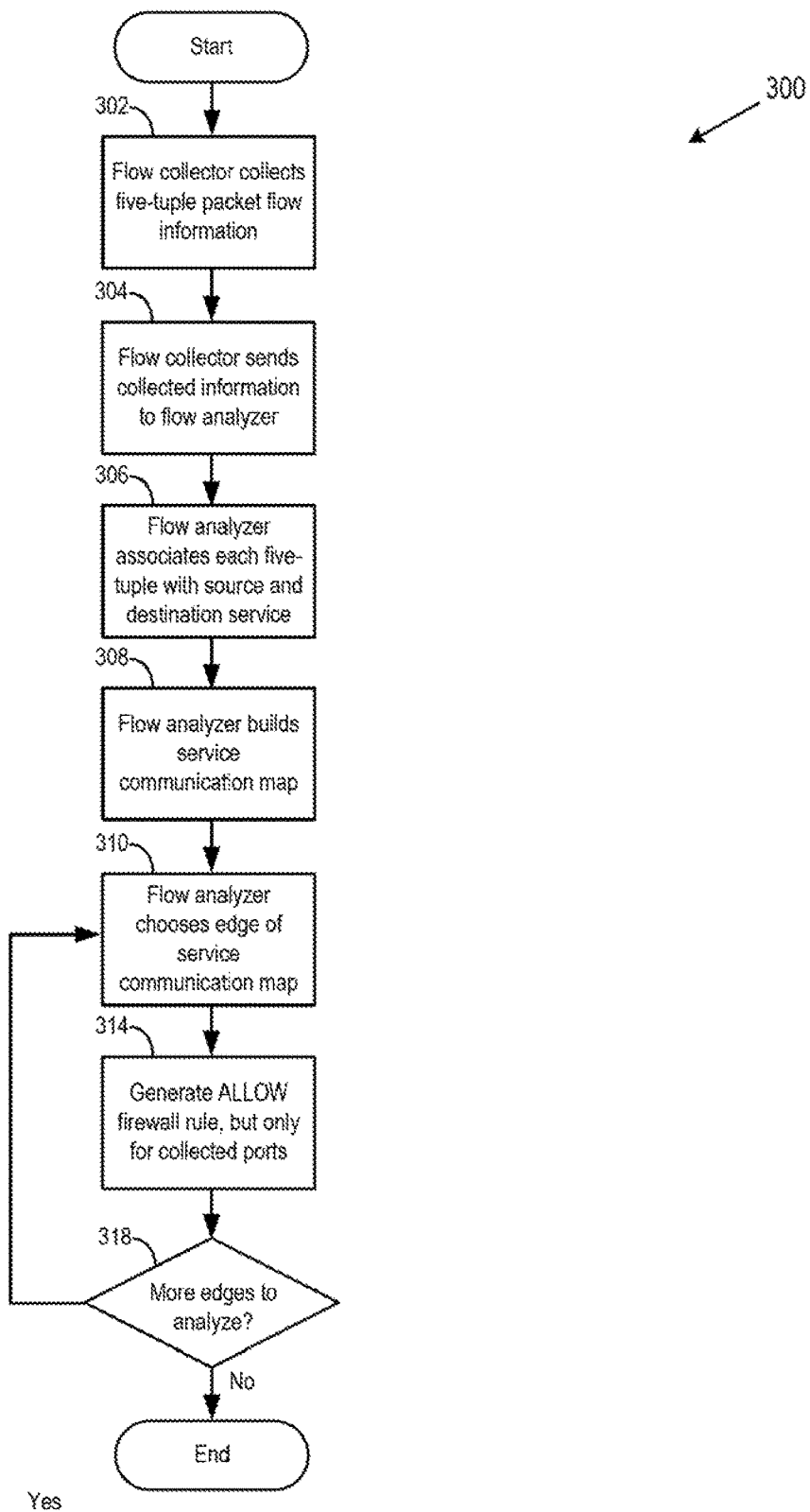
FIG. 3 depicts a flow diagram of a method of creating rules for a firewall based on a service communication flow, according to an embodiment.
Figure 4:
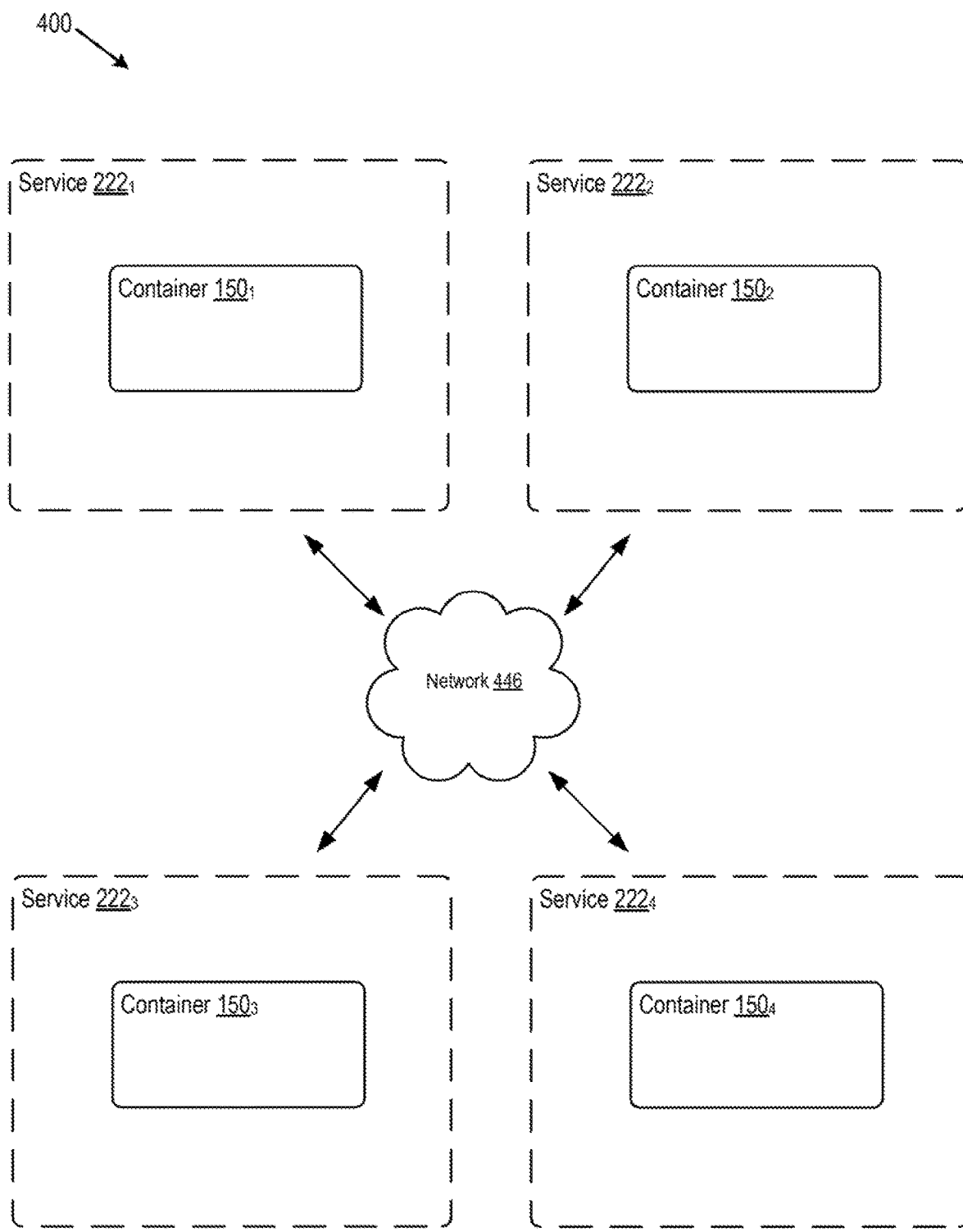
FIG. 4 depicts a block diagram of a computer system in which one or more embodiments of the present disclosure may be utilized, according to an embodiment.

FIG. 3 depicts a flow diagram of a method 300 of creating rules for firewall 238 based on a service communication flow, according to an embodiment. FIG. 3 is described with reference FIGS. 4 and 5.

At block 302, flow collector 132 collects container communication flow information, as described above. The collected information may be in the form of a five-tuple that includes a source IP, source port, destination IP, destination port, and protocol, as described above. Optionally, every five-tuple may be time-stamped. Block 302 may continue for a given length of time. For example, the collection of block 302 may continue for 10 seconds, 30 seconds, one minute, or five minutes before method 300 continues from block 302 to block 304.

At block 304, flow collector 132 provides to flow analyzer 134 information collected at block 302. Block 304 may occur after the collection of block 302 has occurred for the given length of time.

At block 306, flow analyzer 134 obtains flow information from flow collector 132, and contacts container orchestrator 136 to obtain associations between IP addresses and services 222. Rather than contact container orchestrator 136, flow analyzer 134 may access a storage location shared by flow analyzer 134 and container orchestrator 136 to obtain associations between IP addresses and services 222. Block 306 may be further explained with reference to FIG. 4.

FIG. 4 depicts a block diagram of a computer system 400 in which one or more embodiments of the present disclosure may be utilized, according to an embodiment. System 400 comprises a plurality of containers 150 connected by network 446. Network 446 may be network 126, 122, or 146 shown in FIG. 1, may be a networking internal to a single host 105 if containers 150 are located within the same host 105, or network 446 may be a combination of these and/or other networks. Although FIG. 4 shows four containers 150, any number of containers 150, two or more, is possible within system 400.

System 400 is an exemplary arrangement of services 222 associated with containers 150 during an instant of time. The association is shown in FIG. 4 by depicting container 150 within service 222. For an illustrative example of system 400, assume block 302 executes for 30 seconds. That is, flow collector 132 collects container communication flow information for 30 seconds before method 300 continues to block 304. System 400 may represent the state of data center 102 for the first five seconds of the 30 second time interval. Continuing the example, after the first five seconds of the 30-second interval, service $222_2$ might no longer be needed. Container orchestrator 136 then deletes container $150_2$. During the last five seconds of the 30-second interval, service $222_2$ might be needed again, so container orchestrator 136 instantiates another container $150_5$ (not shown) and launches service $222_2$ from the another container $150_5$ (not shown). During the 30-second time interval of block 302, service 222 may be associated with two different containers: container $150_1$ and container $150_5$ (not shown). The two containers may have different IP addresses or the same IP addresses.

Returning to FIG. 3, when flow analyzer 134 obtains associations between IP addresses and services 222 in block 306, flow analyzer 134 utilizes the time stamp of each five-tuple obtained at block 304 to ascertain which service 222 is in communication with which other service 222, as represented by the source IP and destination IP addresses of a given five-tuple. It should be noted that although the discussion considers tuples that have five elements, method 300 may be implemented using tuples or sets of information that are shorter or longer in length than a five-tuple, with the tuples comprising information that differs from the exact information recited within the exemplary five-tuple above.

At block 308, flow analyzer builds a service communication map using the information obtained and associated at blocks 304 and 306. The service communication map maps which services 222 have communicated with each other during the period of time of flow collection of block 302 (e.g., 30 seconds). An exemplary service communication map is shown in FIG. 5.

Figure 5:
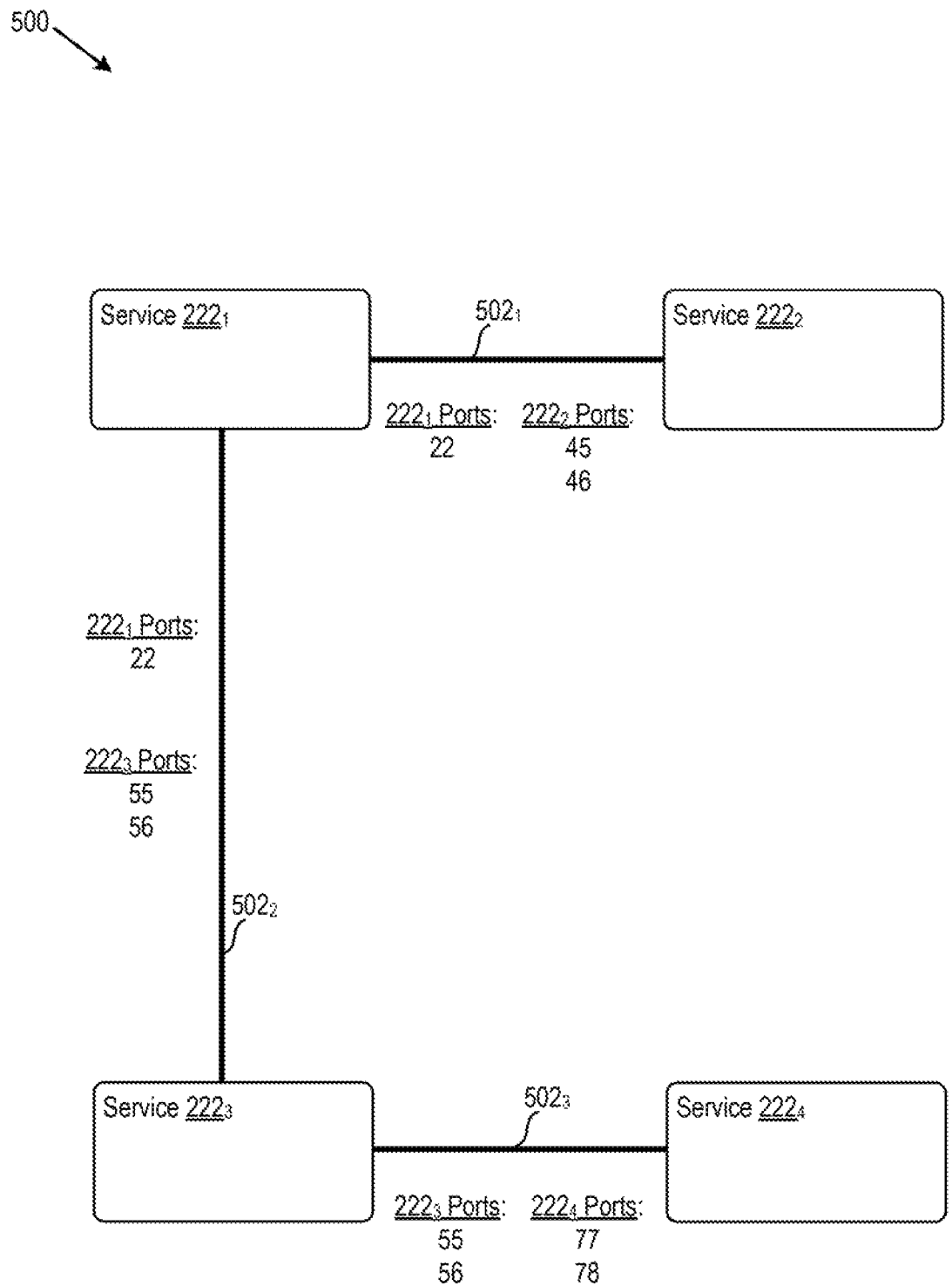
FIG. 5 depicts a block diagram of an exemplary service communication map, according to an embodiment.

FIG. 5 depicts a block diagram of an exemplary service communication map 500, according to an embodiment. Each node of the map 500 represents a service 222. If an edge 502 connects two services 222, this means that the two connected services 222 exchanged one or more packets during the time period of flow collection of block 302.

Exemplary service communication map 500 is a map that may be constructed out of the communication patterns of services 222 depicted in FIG. 4. For example, system 400 of FIG. 4 may represent an online store, and services 222 may be various modular functions used for proper operation of the store. Continuing the example, service $222_1$ may be a user interface of the store, service $222_2$ may be a checkout service, service $222_3$ may be a catalog service, and service $222_4$ may be a database of products available for purchase from the store. Exemplary service communication map 500 shows that user interface service $222_1$ communicated with the checkout service $222_2$ and the store catalog $222_3$, but user interface did not communicate with database service $222_4$ during the time interval. Exemplary service communication map 500 shows that only the catalog $222_3$ communicated with the database service $222_4$.

Each edge 502 is associated with source and destination port numbers used for communication by the two services 222 connected by the edge 502. For example, for the first five seconds of the 30 second time interval of flow collection of block 302, service $222_1$ may have been associated with port 22, while service $222_3$ may have been associated with port 45. Service $222_2$ and its container may have been deleted during the time interval of flow collection, and then service $222_2$ may have been relaunched again in a new container 150 during the time interval. Upon relaunching, service $222_2$ may have been associated with a different port 46. For another example, every time service $222_2$ is launched, it may be associated with two different port numbers 45 and 46, each functioning equally and interchangeably. In these two examples, flow collector 132 may collect five-tuples from packets sent between services $222_1$ and $222_2$, and some of the five tuples may contain a port 45 associated with service $222_2$, and some five-tuples may record a port 46 associated with service $222_2$. For a third example, two or more services 222 may be executing from the same container image 252 and therefore from the same container 150. Each service 222 running from container 150 may have a different port number but be associated with the same container identifier.

Returning to FIG. 3, at block 310, flow analyzer 134 chooses, from the service communication map constructed at block 308, an edge connecting a pair of services 222. If block 310 is reached from block 318, then flow analyzer 134 chooses an edge 502 such that the edge 502 is not an edge 502 that has been chosen previously at block 310. The presence of edge 502 connecting a first and a second service of the pair of services 222 indicates that the two services 222 communicated with one another at some point during the duration of information collection at block 302.

At block 314, flow analyzer 134 creates one or more rules for firewall 238 to allow communication between the pair of services 222 chosen at block 310. The rule(s) may be created in conjunction with firewall 238. In an embodiment, the created rule(s) only allows communication if the ports used for the source service 222 are the same as the ports associated with the source ports of edge 502 connecting the two services, and only if the ports used for the destination service 222 are the same as the ports associated with the destination ports of edge 502 connecting the two services.

For example, with reference to FIG. 5, assume that the pair of services chosen at block 310 is the pair of service $222_1$ and service $222_2$. The rule(s) created at block 314 then would allow a packet from service $222_1$ to reach service $222_2$ if the packet is sent from port 22 of service $222_1$ to either port 45 or 46 of service $222_2$. The rule(s) created at block 314 would also allow a packet from service $222_2$ to reach service $222_1$ if the packet is sent from either port 45 or 46 of service $222_2$ to port 22 of service $222_1$.

It should be noted that for each pair of services 222 not connected by edge 502 within the service communication map generated at block 308, a default firewall rule may be maintained. The default rule may be set or pre-generated by an administrator of data center 102. The default rule may be, for example, to deny communication or to allow communication between the pair of services 222.

At block 318, flow analyzer 134 determines whether more unanalyzed pairs of services 222 of the map generated at block 308 remain for analysis at blocks 312 through 316. If more pairs remain, then method 300 returns to block 310. If not, then method 300 ends.

Figure 6:
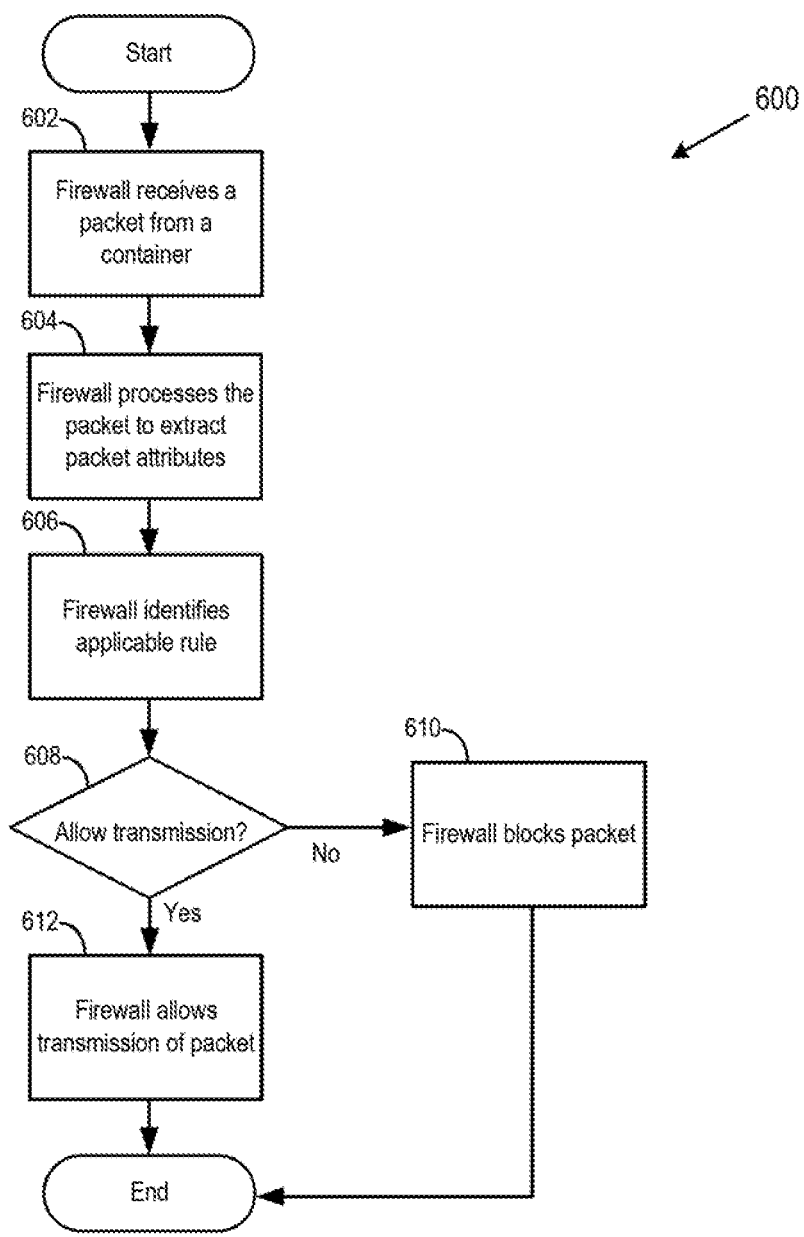
FIG. 6 depicts a flow diagram of processing network packets according to one or more firewall rules, according to an embodiment.

FIG. 6 depicts a flow diagram of processing network packets according to one or more firewall rules generated by method 300, and allowing or blocking the network packets based on the generated rules, according to an embodiment. At block 602, firewall 238 receives a network packet sent by one of containers 150.

At block 604, firewall 238 processes the packet to extract packet attributes. The packet attributes may be some or all of packet attributes present in the exemplary five-tuple, described above. For example, extracted packet attributes may include source IP, source port number, destination IP, and destination port number.

At block 606, firewall 238 uses one or more packet attributes extracted at block 604 to identify one or more applicable rules out of a plurality of security rules of firewall 238.

At block 608, firewall 238 compares some or all extracted attributes to the logic of the one or more applicable rules identified at block 608 to determine whether to allow transmission of the packet or to block transmission of the packet. If the packet is to be blocked, method 600 continues to block 610. If the packet is to continue to its destination, then method 600 continues to block 612.

At block 610, firewall 238 blocks transmission of the packet. After block 610, method 600 ends.

At block 612, firewall 238 allows transmission of the packet. After block 612, method 600 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). The methodology described herein also applies to "unikernel" containers, which are containers that include a lightweight kernel as part of the container image, do not require a standard general-purpose OS on which to run, and may instead run on a hypervisor rather than the standard general-purpose OS. OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of generating or maintaining a firewall rule of a firewall of a computer system, the computer system comprising a plurality of containers executing on one or more operating systems, the method comprising:
    obtaining, at a flow analyzer from a flow collector, during a period of time, flow information of packets sent between containers of the plurality of containers, wherein the flow information comprises a source Internet Protocol (IP) address, a source port number, a destination IP address, and a destination port number;
    obtaining, at the flow analyzer from the flow collector, a timestamp associated with the period of time during which the flow information is collected by the flow collector;
    sending, by the flow analyzer, to a container orchestrator of the plurality of containers, a request for an association of services to containers, wherein the request comprises the flow information and the timestamp;
    determining, by the container orchestrator, based on the flow information and the timestamp, a first association of the source IP address and the source port number to a first service associated with a first container of the plurality of containers during the period of time, and a second association of the destination IP address and the destination port number to a second service associated with a second container of the plurality of containers during the period of time;
    obtaining, at the flow analyzer from the container orchestrator of the plurality of containers, information indicating the first association and the second association;
    based on the first and second associations, generating a service communication graph mapping communication between the first service and the second service during the period of time;
    determining whether the first service communicated with the second service during the period of time based on the service communication graph; and
    based on the determining, generating or maintaining a rule for the firewall to block or allow transmission of packets between the first service and the second service, wherein whether the rule is to block or allow transmission is based on whether the first service and the second service communicated during the period of time.

2. The method of claim 1, wherein the first service is further associated with a third container.

3. The method of claim 2, the method further comprising, during the obtaining the flow information:
    running the first service from the first container, the first container being associated with a first container identifier;
    deleting the first container; and
    instantiating the third container and launching the first service from the third container, the third container being associated with a second container identifier.

4. The method of claim 1, wherein the rule is to allow the transmission, and wherein, based on the rule, the firewall only allows transmission of a packet between the first service and the second service if the packet comprises a port number associated with the first service or the second service.

5. The method of claim 1, wherein the first container is executing within a virtual machine, and wherein the one or more operating systems include a guest operating system of the virtual machine.

6. The method of claim 1, wherein the first container is instantiated from a container image, and wherein the container image comprises executable code of the first service, system tools, configurations, settings, system libraries, and file system.

7. The method of claim 1, wherein the containers of the plurality of containers are executing on a plurality of host machines, and wherein the flow collector extracts the flow information from the packets and is located outside of the plurality of host machines.

8. The method of claim 1, the method further comprising:
receiving, by the firewall, a packet from the first container, the second container, or a third container;
processing the packet to extract packet attributes;
comparing the packet attributes to the rule; and
based on the comparing, allowing or blocking transmission of the packet.

9. The method of claim 1, wherein the determining whether the first service communicated with the second service during the period of time comprises:
determining that the first service did not communicate with the second service during the period of time, and maintaining the rule, wherein the rule is a pre-generated default rule.

10. A non-transitory computer readable medium comprising instructions to be executed in a processor of a computer system, the instructions when executed in the processor cause the computer system to carry out a method of generating or maintaining a firewall rule of a firewall of the computer system, the computer system comprising a plurality of containers executing on one or more operating systems, the method comprising:
obtaining, at a flow analyzer from a flow collector, during a period of time, flow information of packets sent between containers of the plurality of containers, wherein the flow information comprises a source Internet Protocol (IP) address, a source port number, a destination IP address, and a destination port number;
obtaining, at the flow analyzer from the flow collector, a timestamp associated with the period of time during which the flow information is collected by the flow collector;
sending, by the flow analyzer, to a container orchestrator of the plurality of containers, a request for an association of services to containers, wherein the request comprises the flow information and the timestamp;
determining, by the container orchestrator, based on the flow information and the timestamp, a first association of the source IP address and the source port number to a first service associated with a first container of the plurality of containers during the period of time, and a second association of the destination IP address and the destination port number to a second service associated with a second container of the plurality of containers during the period of time;
obtaining, at the flow analyzer from the container orchestrator of the plurality of containers, information indicating the first association and the second association;
based on the first and second associations, generating a service communication graph mapping communication between the first service and the second service during the period of time;
determining whether the first service communicated with the second service during the period of time based on the service communication graph; and
based on the determining, generating or maintaining a rule for the firewall to block or allow transmission of packets between the first service and the second service, wherein whether the rule is to block or allow transmission is based on whether the first service and the second service communicated during the period of time.

11. The non-transitory computer readable medium of claim 10, wherein the first service is further associated with a third container.

12. The non-transitory computer readable medium of claim 11, the method further comprising, during the obtaining the flow information:
running the first service from the first container, the first container being associated with a first container identifier;
deleting the first container; and
instantiating the third container and launching the first service from the third container, the third container being associated with a second container identifier.

13. The non-transitory computer readable medium of claim 10, wherein the rule is to allow the transmission, and wherein, based on the rule, the firewall only allows transmission of a packet between the first service and the second service if the packet comprises a port number associated with the first service or the second service.

14. The non-transitory computer readable medium of claim 10, wherein the first container is executing within a virtual machine, and wherein the one or more operating systems include a guest operating system of the virtual machine.

15. The non-transitory computer readable medium of claim 10, wherein the first container is instantiated from a container image, and wherein the container image comprises executable code of the first service, system tools, configurations, settings, system libraries, and file system.

16. The non-transitory computer readable medium of claim 10, wherein the containers of the plurality of containers are executing on a plurality of host machines, and wherein the flow collector extracts the flow information from the packets and is located outside of the plurality of host machines.

17. The non-transitory computer readable medium of claim 10, the method further comprising:
receiving, by the firewall, a packet from the first container, the second container, or a third container;
processing the packet to extract packet attributes;
comparing the packet attributes to the rule; and
based on the comparing, allowing or blocking transmission of the packet.

18. A computer system comprising:
a firewall;
a plurality of containers executing on one or more operating systems; and
at least one hardware processor, wherein the at least one hardware processor is configured to:
obtain, at a flow analyzer from a flow collector, during a period of time, flow information of packets sent between containers of the plurality of containers, wherein the flow information comprises a source Internet Protocol (IP) address, a source port number, a destination IP address, and a destination port number;

obtain, at the flow analyzer from the flow collector, a timestamp associated with the period of time during which the flow information is collected by the flow collector;

send, by the flow analyzer, to a container orchestrator of the plurality of containers, a request for an association of services to containers, wherein the request comprises the flow information and the timestamp;

determine, by the container orchestrator, based on the flow information and the timestamp, a first association of the source IP address and the source port number to a first service associated with a first container of the plurality of containers during the period of time, and a second association of the destination IP address and the destination port number to a second service associated with a second container of the plurality of containers during the period of time;

obtain, at the flow analyzer from the container orchestrator of the plurality of containers, information indicating the first association and the second association;

based on the first and second associations, generate a service communication graph mapping communication between the first service and the second service during the period of time;

determine whether the first service communicated with the second service during the period of time based on the service communication graph; and generate or maintain a rule for a firewall to block or allow transmission of packets between the first service and the second service, wherein whether the rule is to block or allow transmission is based on whether the first service and the second service communicated during the period of time.

\* \* \* \* \*